April 25, 1933.  M. T. LATTA  1,906,009
TREAD BLOCK
Filed Oct. 11, 1932
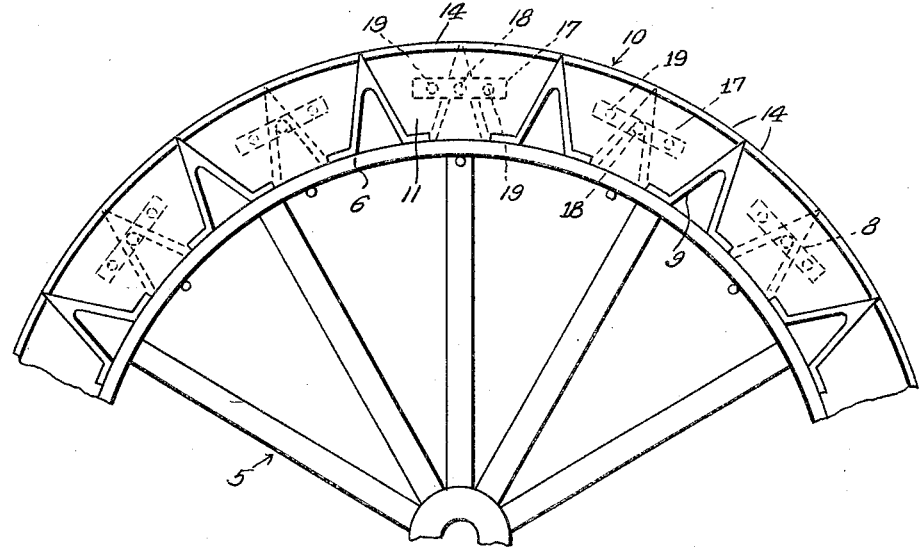
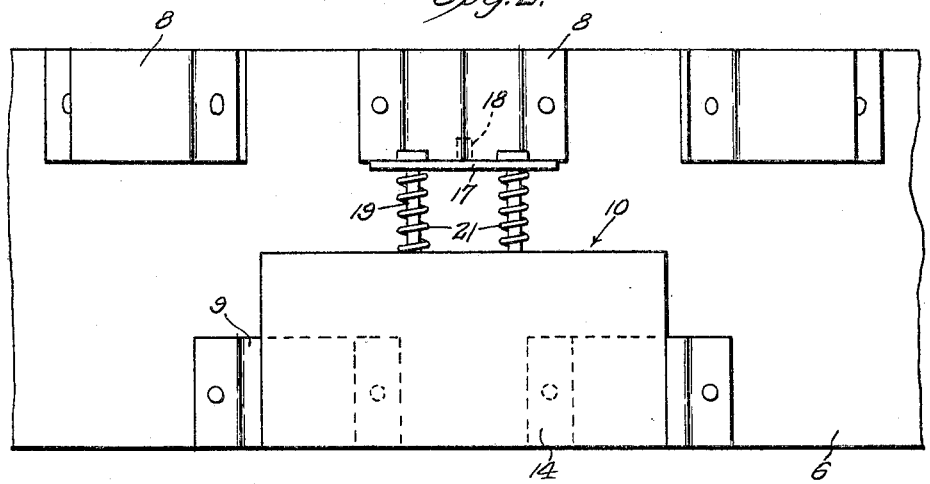
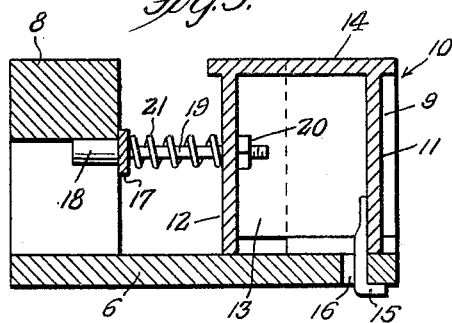
Inventor
M. T. Latta,
By Clarence A. O'Brien
Attorney Patented Apr. 25, 1933

1,906,009

UNITED STATES PATENT OFFICE

MELVIN T. LATTA, OF HILLSBORO, NORTH CAROLINA

TREAD BLOCK

Application filed October 11, 1932. Serial No. 637,318.

This invention relates broadly to wheels, and particularly to traction wheels such as are employed on tractors, agricultural implements and the like, which wheels as are well known are usually provided on their rim or periphery with two rows of staggeredly arranged cleats.

It is an object of the present invention to provide means whereby such a tractor wheel may be readily converted into a substantially smooth round wheel that can be driven on a street or highway without damage to the latter. To this end the invention consists in the provision of a plurality of what may be termed tread blocks which may be readily applied to the lug equipped wheel, and which are of such construction as, when applied to the wheel, to provide a smooth round tread or tire for the wheel.

The invention together with its numerous objects and advantages will be best understood from a study of the following description, taken in connection with the accompanying drawing wherein:

Figure 1 is a side elevational view of a portion of a wheel having my invention applied thereto.

Figure 2 is a plan view of a portion of the lug equipped rim of the wheel, the invention being shown applied thereto, and Figure 3 is a transverse sectional view through a tread block, the same being shown applied to the wheel rim.

With reference more in detail to the drawing it will be seen that the invention is readily applicable to a conventional type of tractor wheel, a portion of which is shown in the drawing and designated generally by the reference character 5. The wheel 5 includes among other parts a rim 6 on which are suitably mounted two rows 8, 9 of staggeredly arranged traction cleats.

In accordance with the present invention there is provided a plurality of what may be termed tread blocks 10, and as will be clear from a study of Figure 3, each block 10 is of shell like construction and is segmental in form. The shell 10 includes the side walls 11, 12, end walls 13, and a longitudinally curved top wall or tread face 14.

The block 10 is of a shape as to readily fit between two adjacent cleats of the row 9 of such cleats, and when so positioned, it will be seen that the walls 13 of the block engage the inclined sides of the cleats, with the wall or sides 14 presented in a manner to engage the ground as the wheel revolves.

For securing the block 10 in position, the wall thereof is provided with a hook 15 adapted to be engaged in an aperture 16 in the rim 6 in the manner clearly shown in Figure 3.

There is also provided a plate 17 which on one side thereof, intermediate its ends is equipped with a pin 18 adapted to fit in the crotch of a lug of the other row 8 of the lugs when the plate 17 is disposed against the inner side of said lug of row 8 in a manner suggested in Figures 2 and 3. Bolts 19 extend through the ends of the plate 17 and through apertures in the side 12 of the block and the ends of the bolts within the block 10 have nuts 20 threaded thereon. Disposed about the bolts 19 are springs 21 arranged between the plates 17 and the wall or side 11 of the block 10, and these springs serve to normally urge the block 10 into position between the lugs 9.

As will be clear from a study of Figures 1 and 2, the blocks 10 are arranged in a circular row on the wheel and when so arranged, the ends of the sides 14 of the block are closely arranged as shown in Figure 1 and provide a smooth endless tread or tire for the wheel, which tire will engage the surface of the roadway and thus prevent the traction lugs engaging the roadway and damaging it as would otherwise of course be the result.

It will also be noted that the front wall or side 11, together with the end walls or sides 13 of the block 10 at the base or open side of the block are suitably notched to accommodate the anchoring or base flanges of the lugs 9.

Even though I have herein described and shown the preferred embodiment of the invention, it is to be understood that the same is susceptible of further changes, modifications and improvements coming within the scope of the appended claims.

Having thus described my invention, what I claim as new is:

1. In a traction wheel, in combination, a rim, two series of staggeredly arranged traction lugs on said rim, a circular series of blocks arranged between the lugs of one series, means on the blocks engageable with said rim for securing the blocks against radial displacement, and means interposed between said blocks and adjacent lugs of the other series for normally urging said blocks axially relative to the wheel and into position between the lugs of the first named series.

2. In a traction wheel, in combination, a rim, two series of staggeredly arranged traction lugs on said rim, a circular series of blocks arranged between the lugs of one series, means on each block engageable with said rim for securing the block against radial displacement, and means interposed between said block and an adjacent lug of the other series for normally urging said block axially relative to the wheel and into position between lugs of the first named series, said last named means including a plate adapted to be disposed against one side of said adjacent lug of the second series, bolts extending through said plate and one side of said block, and springs disposed about the bolts and interposed between said plate and one side of said block.

3. A tread for a cleated traction wheel, comprising a series of separate filler blocks for the spaces intermediate adjacent cleats of a row, hooks on the blocks engageable with the rim of the wheel, and yieldable means projecting laterally from the blocks to bear against adjacent cleats in a second row whereby said blocks are urged into the spaces between the first named cleats.

4. As a new article of manufacture, a tread block for cleated traction wheels comprising a body having securing means projecting laterally therefrom, a member slidably engaged with said securing means, and elastic means interposed between said body and said slidable member for normally urging the latter laterally from said body.

5. As a new article of manufacture, a tread block of the character stated comprising a block member, bolts extending laterally from one side of the block member, a plate extending between said bolts and slidably engaged therewith, springs arranged about the bolts between said block member and said plate, and said block member being also provided with a retaining element extending from the under surface of the block member substantially normal to that surface.

In testimony whereof I affix my signature.

MELVIN T. LATTA.